July 22, 1930.　　　A. O. ABBOTT, JR　　　1,770,895
METHOD OF BUILDING TIRES AND PRODUCT
Filed July 30, 1926
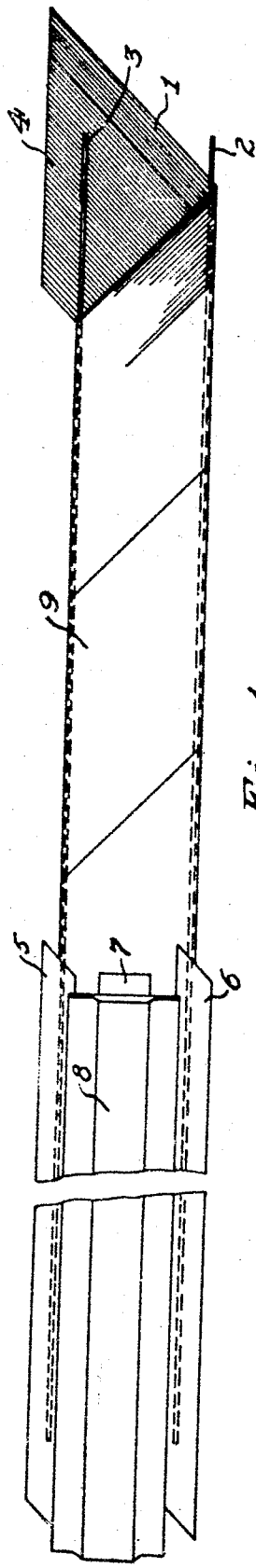
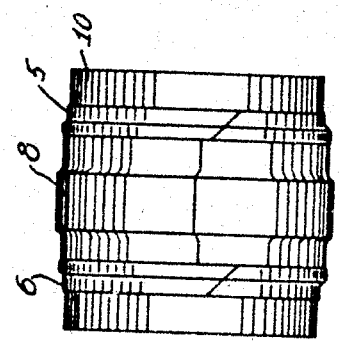
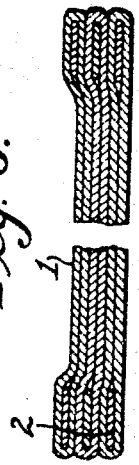
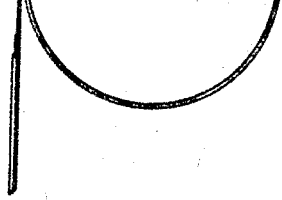
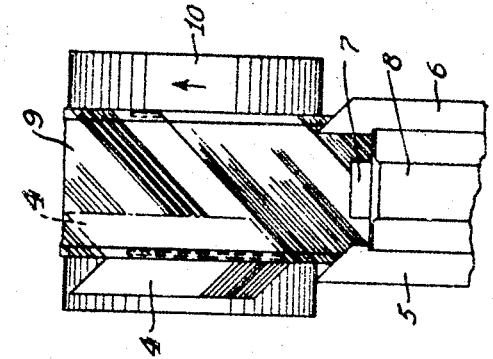
INVENTOR
Adrian O. Abbott, Jr.
BY
Ernest Hopkinson
ATTORNEY Patented July 22, 1930

1,770,895

UNITED STATES PATENT OFFICE

ADRIAN O. ABBOTT, JR., OF DETROIT, MICHIGAN, ASSIGNOR TO MORGAN & WRIGHT, OF DETROIT, MICHIGAN, A CORPORATION OF MICHIGAN

METHOD OF BUILDING TIRES AND PRODUCT

Application filed July 30, 1926. Serial No. 125,930.

This invention relates to the manufacture of pneumatic tires for vehicles, but more particularly to an improvement in the art of flat building such tires and has for its primary object to provide a simple and economical method of manufacture and an improved tire.

This invention is particularly applicable to the manufacture of either straight side or clincher tires and consists primarily in the building of the tire carcass in the form of a slab containing substantially all the elements of the built tire and thereafter winding the slab about a suitable object to bring the same to annular form. The spliced slab or pulley-band, as it is generally termed, is then shaped or expanded in any well known manner, as for example, by use of vacuum, and subsequently vulcanized.

Further objects of the invention are to facilitate the incorporating of the cord or other fabric in the carcass, to provide an improved method of building the carcass with the required number of plies, to provide an improved method of incorporating the bead material in the body of the slab and in general to reduce the cost of production and provide an improved strengthened tire carcass.

Still other objects of the invention are to provide a method of constructing tires which will eliminate bias cutting of the fabric with the usual labor and machinery incident thereto, as well as storing and handling of the bias cut stock.

A further object of the invention is to insure a safe toe on the tire.

The many other objects and advantages of the invention will be better understood by reference to the following specification when considered in connection with the accompanying drawing illustrating an embodiment thereof in which:

Fig. 1 is a plan view of a tire slab illustrating the method of assembling the elements;

Fig. 2 is a plan view illustrating one method of wrapping the slab onto a drum;

Fig. 3 is a diagrammatic view transversely of Fig. 2 showing the slab and the drum with one turn made; and Fig. 4 is an elevation of a spliced slab mounted on a forming drum.

Figs. 5 and 6 are detail sectional views through the pulley band.

In the method forming the subject matter of the present invention the elements are first incorporated in a slab or strip, which may be formed either manually or mechanically. The formed slab is then preferably wound about a drum and the ends of the elements spliced to produce the usual pulley-band. The drum may be either the correct diameter or may be smaller than the diameter needed to gauge the proper diameter of the bead. After the slab has been spliced the pulley-band is expanded or otherwise brought to tire form and then vulcanized in the usual manner.

In the preferred method for the formation of the slab the bead wires 2 and 3 are held in substantially parallel relation preferably in the manner indicated in Fig. 1. A strip of cord or other rubber impregnated fabric as 1 is then wound helically about these wires so that each turn of the fabric laps over the previous turn of fabric and thus a strip of double ply material is produced in which the bead wires are enveloped. The length of the bead wires and therefore of the plied strip will depend upon the size of the tire to be made and the number of plies of fabric desired in the completed tire. When a double ply of fabric has been formed of suitable length, the fabric is cut parallel to the bead wire but leaving a rather pronounced excess of material 4 projecting beyond the bead wire, for a purpose to be later described. There has now been formed a double layer of fabric, the cords of which on one side are parallel and the cords on the other side are parallel, but the cords of each layer cross one another at an angle. When so wrapped about the bead wires as to form just two layers of fabric the cords cross each other at right angles. The wrapping may be varied so as to increase the number of the plies of fabric and vary the angle at which they cross. After this plied strip has been formed in the manner described, the chafing strips 5 and 6, the breaker 7 and the tread 8 are laid upon the upper face of the strip in the manner indicated, forming a completed slab. As shown the tread is sufficiently wide to serve as sidewalls also. In addition to these strips, other strips of material such as a cushion and separate sidewalls, can be used. The plied strip 9 composed of the bead wires and fabric should extend sufficiently lengthwise beyond the assembly of chafing strips, breaker and tread so that the required number of plies of fabric will be formed when the slab is wound upon a forming drum. In the preferred embodiment, the assembly is positioned at one end of the fabric strip but if desired, it may be mounted elsewhere upon the fabric. If a tire is to be made with 4 plies, the length of the strip 9 of plied material should be sufficient to permit the same to be wound a complete revolution about the forming drum of the proper size before the assembly is applied. Therefore, the strip should extend beyond the end of the assembly a distance at least equal to the circumference of the drum.

It is preferable that thick strips of material, such as the tread, should have tapered ends for convenience in splicing. The strips of material, constituting breaker, tread and chafing strips, are usually positioned on the plied strip of fabric to form stepped ends for convenience in splicing. The plies of fabric constitute the tire carcass.

The method of winding the assembled slab upon the forming drum is illustrated in Figs. 2 and 3 of the drawing. The drum 10 is of the proper diameter for the size of tire to be produced. The end of plied strip 9 is first applied to the drum by any suitable method and the drum is given one revolution in the direction indicated by the arrow in Fig. 2. The pulley-band is now in a position shown in Fig. 3. A slight further turn of the drum allows the fabric to overlap a distance equal to the width of the fabric before the assembly begins to wrap around the drum as shown in Fig. 2. The end of the fabric 4 which in Fig. 2. The end of the fabric 4 which now serves as a flap is then turned from its position in solid lines shown in Fig. 2 outwardly around the adjacent bead wire to the position shown in dotted lines in Fig. 2. In so doing the exposed length of bead wire 3 is enclosed by fabric. The drum is revolved again until the entire tire assembly has been wrapped around the drum. When this has taken place, the flap is held in position by the overlying layers of the pulley-band. When a 4-ply tire is to be made, two revolutions of the drum will wrap the entire material in place. If a 6 or 8-ply tire is to be made, three or four revolutions respectively of the drum will be necessary. The slab may be marked along its edges or in any other manner to indicate its position for one revolution of the strip and thereafter it can be wound upon the first winding and such subsequent windings will come now into position in the proper relation. In case a pulley-band having six or eight plies of fabric is desired, it may be desirable to rotate the drum two or three revolutions respectively before the flap is turned into final position, or the flap may be folded into position at the completion of one wrapping around the drum. The flap may be stitched down in any suitable manner after which the rest of the pulley-band is wound around the drum.

Fig. 5 shows a section through the band when the slab has been wound around the drum twice to form a pulley-band having four plies of fabric. In this form there are two bead wires 2, which together operate to form a single bead. Fig. 6 shows a section through the bead when a pulley-band having six plies of fabric has been formed. In this modification there are three bead wires co-operating to form a single bead. The bead of the tire contains two or more helical turns of wire each enclosed by a layer of fabric. It is evident that the size of the bead strengthening elements or wire can be varied so that in the formation of a pulley-band having a greater number of plies of fabric, a smaller size bead wire may be used than where a lesser number of plies of fabric are formed. This variation in size of bead wire will provide for lessening or increasing bulk, strength and rigidity of the bead as desired. Other material can be substituted for the bead wire, for example, lengths of rubber composition, etc.

After the slab has been wound upon a drum in the manner described, the opposite ends of the corresponding chafing strips, breaker, and the tread are spliced together either successively or simultaneously. The breaker 7 and chafing strips 5 and 6 are of such length that they make a short lap on their opposite ends while tread 8 meets and its skived ends are spliced as shown in Fig. 4. The band is now removed from the drum and the chafing strips 5 and 6 are turned back inside the tire band either mechanically or by hand. This completes the forming of the pulley-band and this pulley-band is now ready to be expanded or otherwise brought to tire form by any well known method but preferably by use of a vacuum. The shaped tire is next vulcanized in the usual manner.

The winding of the cord or other fabric helically about the beads is a simple and economical method of incorporating the fabric in the tire and readily permits the preparing of the slab from a single continuous strip of fabric. This eliminates the cutting of the fabric into a series of short lengths and the necessity of exercising considerable ingenuity and skill and expenditure of time in the building of the slab. Being made from one strip of fabric, the tire is stronger than if made up of spliced strips. A roll of fabric can be sliced, for example, into three or four strips and these strips can then be wound directly around the wires simultaneously. Bias cutting with the usual labor and machinery incident thereto, as well as storage and handling of the bias cut stock are all done away with by this method. The helical winding also provides the oblique arrangement of the cords which is considered advantageous in tire construction, and at the same time a uniform thread angle is obained. Also the cords in adjoining plies extend in different directions.

Tires as ordinarily made are provided with turned-up portions of fabric around the bead in order to hold the bead securely in place. The necessity for turn-ups with the present construction of tire is eliminated, thus effecting a desired saving of fabric and at the same time a safer toe is provided, since there is no weakened place adjacent the bead.

Various applications of the method forming the subject matter of this invention have been hereinbefore described but it is to be understood that these are solely for the purpose of illustration as different embodiments of the invention may be made without departing from the spirit thereof and it is not intended that the invention should be limited to any specific form except as determined by the scope of the appended claims.

Having thus described my invention, what I claim and desire to protect by Letters Patent is:

1. As an article for tire manufacture, a slab comprising a plurality of superimposed plies of fabric and at least one strip of rubber composition carried thereby which is of less length than the slab.

2. As an article for tire manufacture, a slab comprising a plurality of superimposed layers of fabric, at least one strip of rubber composition disposed on a portion thereof, the layers of fabric being of a length at least twice as great as the length of the strip of rubber composition.

3. As an article for tire manufacture, a slab comprising a plurality of superimposed plies of helically wound fabric constituting a carcass, and at least one strip of rubber composition carried by the carcass.

4. A pulley band comprising a plurality of superimposed pairs of plies of a continuous helix of fabric, bead material interposed within each pair of plies and at least one strip of rubber composition carried by one of the plies.

5. A pulley band comprising a plurality of superimposed plies of fabric consisting of a continuous helix of fabric, at least one strip of rubber composition mounted upon the outer ply, one of the ends of the helix of fabric being interposed between the plies.

6. A complete flat blank for a tire comprising an underlying carcass portion composed of spaced bead strengthening elements covered by a single strip of helically wound fibrous material, and a superposed tread portion, said carcass portion being of a length substantially a multiple of the length of the tread portion.

7. In the manufacture of a tire casing, the steps which comprise forming a substantially flat strip of superimposed plies of fabric and mounting upon the strip at least one strip of rubber composition of less than the length of the strip of fabric to form a substantially flat slab.

8. In the manufacture of a tire casing, the steps which comprise mounting at least one strip of rubber composition upon one end of a substantially flat strip of fabric of greater length to form a slab having a reduced end, winding the reduced end of the slab longitudinally about itself at least one to form an annulus, and winding the remainder of the slab around the annulus to form a pulley band.

9. In the manufacture of a tire casing, the steps which comprise disposing lengths of bead material in substantially parallel spaced relation, wrapping a single strip of fabric around the bead material to form a plied carcass, severing the carcass into lengths and superimposing on a portion thereof at least one strip of rubber composition to form a substantially flat slab.

10. In the manufacture of a tire casing, the steps which comprise winding a strip of fabric around lengths of bead material to form a two-ply carcass, superimposing a layer of rubber composition on a part thereof to form a substantially flat slab, and winding the slab longitudinally about itself to form a pulley band having at least four plies of fabric.

11. In the manufacture of a tire casing, the steps which comprise helically winding fabric around spaced lengths of bead material to form a substantially flat carcass consisting of a plurality of plies of fabric embracing the bead material, applying at least one layer of rubber composition to a part of the carcass to form a slab and rolling the slab longitudinally about itself to form a pulley band.

12. In the manufacture of a tire casing, the steps which comprise enveloping a frame of bead material with fabric to form a two-ply carcass, mounting at least one strip of rubber composition upon a part of the carcass to form a substantially flat slab, and winding the slab about itself to form a pulley band.

13. In the manufacture of tire casings, the steps which comprise enveloping spaced lengths of bead material with a strip of fabric to form a plied carcass having a laterally protruding end of fabric, placing at least one strip of rubber composition upon a part of the carcass to form a slab, forming the other part of the carcass into an annulus, turning the laterally protruding end of fabric over to lie upon the outside of the annulus, and winding the remainder of the slab about the annulus whereby a pulley band is formed, the ends of the fabric of which lie wholly within the surfaces of the pulley band.

14. The method of making a complete pulley band for a tire which comprises forming a two-ply carcass strip by helically winding a strip of fibrous material around spaced bead strengthening elements, said carcass strip being substantially a multiple in length of the desired pulley band circumference, disposing a length of tread material adjacent one end of the carcass strip, and winding up the completed assembly with the tread material on the outside and with the ends of the latter in adjoining relation.

Signed at Detroit, in the county of Wayne and State of Michigan, this 26th day of July, 1926.

ADRIAN O. ABBOTT, Jr.